US 6,729,225 B2

(12) United States Patent
Seo

(10) Patent No.: US 6,729,225 B2
(45) Date of Patent: May 4, 2004

(54) CONNECTING-ROD APPARATUS OF HERMETIC COMPRESSOR

(75) Inventor: Seung-don Seo, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 76 days.

(21) Appl. No.: 10/207,260

(22) Filed: Jul. 30, 2002

(65) Prior Publication Data

US 2003/0136259 A1 Jul. 24, 2003

(30) Foreign Application Priority Data

Jan. 23, 2002 (KR) .......................................... 2002-3892

(51) Int. Cl.[7] ................................................. F01B 9/00
(52) U.S. Cl. ....................................... 92/140; 74/579 E
(58) Field of Search ........................... 92/140; 79/22 A, 79/45, 579 R, 579 E

(56) References Cited

U.S. PATENT DOCUMENTS 4,407,168 A * 10/1983 Andrione et al. ......... 74/579 E
4,422,831 A * 12/1983 Schmid ....................... 417/63
5,671,655 A * 9/1997 Vollrath ....................... 92/128
5,799,565 A * 9/1998 Bo ............................... 92/187

* cited by examiner

Primary Examiner—Edward K. Look
Assistant Examiner—Igor Kershteyn
(74) Attorney, Agent, or Firm—Blank Rome LLP

(57) ABSTRACT

In a connecting apparatus of a hermetic reciprocal compressor to convert a rotary movement into a reciprocal sliding movement by connecting an eccentric portion of a crankshaft and a piston, the connecting apparatus has a ball; a first connecting member having a small diameter portion connected with a piston pin being connected with the piston, and a connection portion extended from the small diameter portion, which has a ball embracing surface to embrace the ball and supports the ball to be moved; a second connecting member having a large diameter portion rotatably connected with the eccentric portion, and an extending yoke portion at an outside of the large diameter, which supports the ball against the embracing surface and prevents the ball from being separated; and a third connecting member to connect the first connecting member and the second connecting member such that the first connecting member an the second connecting member relatively move with the ball being placed therebetween.

7 Claims, 3 Drawing Sheets

CONNECTING-ROD APPARATUS OF HERMETIC COMPRESSOR

BACKGROUND OF THE INVENTION

1. Field of the Invention

The present invention relates to a hermetic reciprocal compressor, and more particularly, to a connecting-rod apparatus of a hermetic reciprocal compressor, which connects a crankshaft and a piston.

2. Description of the Prior Art

A conventional hermetic compressor includes a motor unit having a stator and a rotor rotatably installed next to the stator, a crankshaft, a connecting-rod, and a piston.

The crankshaft is integrally rotated with the rotor that is connected to the crankshaft, and has an eccentric portion at a lower part. The eccentric portion is connected with a large diameter portion formed at one end of the connecting-rod. The piston is connected with a small diameter portion disposed at the other end of the connecting-rod. The piston reciprocally moves in a piston chamber of a cylinder.

In the above structure, the crankshaft is rotated along with the rotor so that the eccentric portion can be rotated. The connecting-rod converts the eccentric rotation of the eccentric portion to linear movement to allow the piston to reciprocally move.

In the meantime, in the hermetic compressor having the above structure, the angle of the axis of the crankshaft and the connecting-rod is a right angle, and the angle is known as a very important mechanical element in designing. Therefore, a forming tolerance is generally written on related elements.

In addition, the piston slides maintaining appropriate clearance in the piston chamber of the cylinder. Yet, the parallelism and the symmetry of the piston with respect to the axis should be maintained constant.

Moreover, the angle of the piston and a piston pin is a right angle. For the connecting-rod, the parallelism and the symmetry of the large diameter portion and the small diameter portion are very important elements.

As described so far, the arrangement of the connecting-rod to the axis of the crankshaft, that is the various mechanical connection relationships based on the connecting-rod is a crucial element in driving the compressor. Therefore, when the arrangement of the connecting-rod to the axis of the crankshaft is not stable, there is friction and abrasion for each element of the compressor. Consequently, the compressor might not be able to drive normally. Especially, when the crankshaft and the piston are not mechanically arrayed, the above problem can be aggravated.

Considering the above problem, an apparatus to compensate the misalignment of the axis of the crankshaft and the axis of the piston has been disclosed in U.S. Pat. No. 6,164,188. In other words, a compressor having a piston-rod connected with a cylinder at one end and a round concave portion at the other end, an alignment adaptor having a concave portion corresponding to the above concave portion at one end and fixed with the piston-rod by using a bolt, a ball inserted between the above two concave portions, and an expansion-rod fixed and connected with the alignment adaptor and a clamp is disclosed therein. According to the above structure, the ball is inserted between the piston-rod and the alignment adaptor. Thus, the ball can move freely, and mis-alignment is effectively compensated. However, to insert the ball, an additional alignment adaptor and a clamp are required. Therefore, there is a problem that the compressor needs a lot of parts and the structure of the compressor is complicated. Consequently, the productivity is decreased.

Furthermore, another compressor including a connecting-rod body having a small end portion to embrace a piston pin and an integrally formed pork portion with a connection hole at the other end, a bushing having a pair of protrusions to be connected with the connection hole, an insert hole for embracing a crank pin, and an elastic clip to fix the body and the bushing is also disclosed. However, in this case, the connecting-rod body and the bushing are connected with each other by the elastic clip, thus there is a limitation in movement and noise is generated due to friction and the abrasion.

SUMMARY OF THE INVENTION

The present invention has been made to overcome the above-mentioned problem of the prior art. Accordingly, it is the object of the present invention to provide a connecting apparatus of a hermetic reciprocal compressor having an improved structure to reduce abrasion and noise.

The above object of the present invention is realized by providing a connecting apparatus of a hermetic reciprocal compressor to convert a rotary movement into a reciprocal sliding movement by connecting an eccentric portion of a crankshaft and a piston according to the present invention, including a ball; a first connecting member having a small diameter portion connected with a piston pin being connected with the piston, and a connection portion extended from the small diameter portion, wherein the connection portion has a ball embracing surface to embrace the ball and supports the ball to be moved; a second connecting member having a large diameter portion rotatably connected with the eccentric portion, and an extending yoke portion at an outside of the large diameter portion, which supports the ball against the embracing surface and prevents the ball from being separated; and a third connecting member to connect the first connecting member and the second connecting member such that the first connecting member an the second connecting member relatively move with the ball placed therebetween.

The ball embracing surface is penetrated from an upper side and an end side of an end portion of the connection portion for a predetermined depth.

The yoke portion is extended from an outside of the large diameter portion in order to face the ball embracing surface, and includes a vertical side and a sloping side formed with respect to a vertical direction to allow the ball to be contacted, and wherein the vertical side and the sloping side are formed as an arc shape in a horizontal direction.

When the first connecting member and the second connecting member are connected, a predetermined flexible gap is defined between an end portion of the connection portion and an outside of the large diameter portion so that the first connecting member and the second connecting member can be relatively rotated.

The flexible gap is between 0.2 mm to about 0.5 mm.

The third connecting member is preferably a metal wire to secure or clamp by wrapping the wire around the large diameter portion and the connection portion.

The first connecting member has an oil passage that penetrates in an upper side of the connection portion and is connected with the small diameter portion, and an oil dropping from the yoke portion of the second connecting member is supplied to the small diameter portion through the oil passage.

BRIEF DESCRIPTION OF THE DRAWINGS

The above-mentioned object and the feature of the present invention will be more apparent by describing the preferred embodiment of the present invention by referring to the appended drawings, in which.

DESCRIPTION OF THE PREFERRED EMBODIMENT

Hereinbelow, a connecting-rod apparatus of a hermetic reciprocal compressor according to the present invention will be described in greater detail by referring to the appended drawings.

Figure 1:
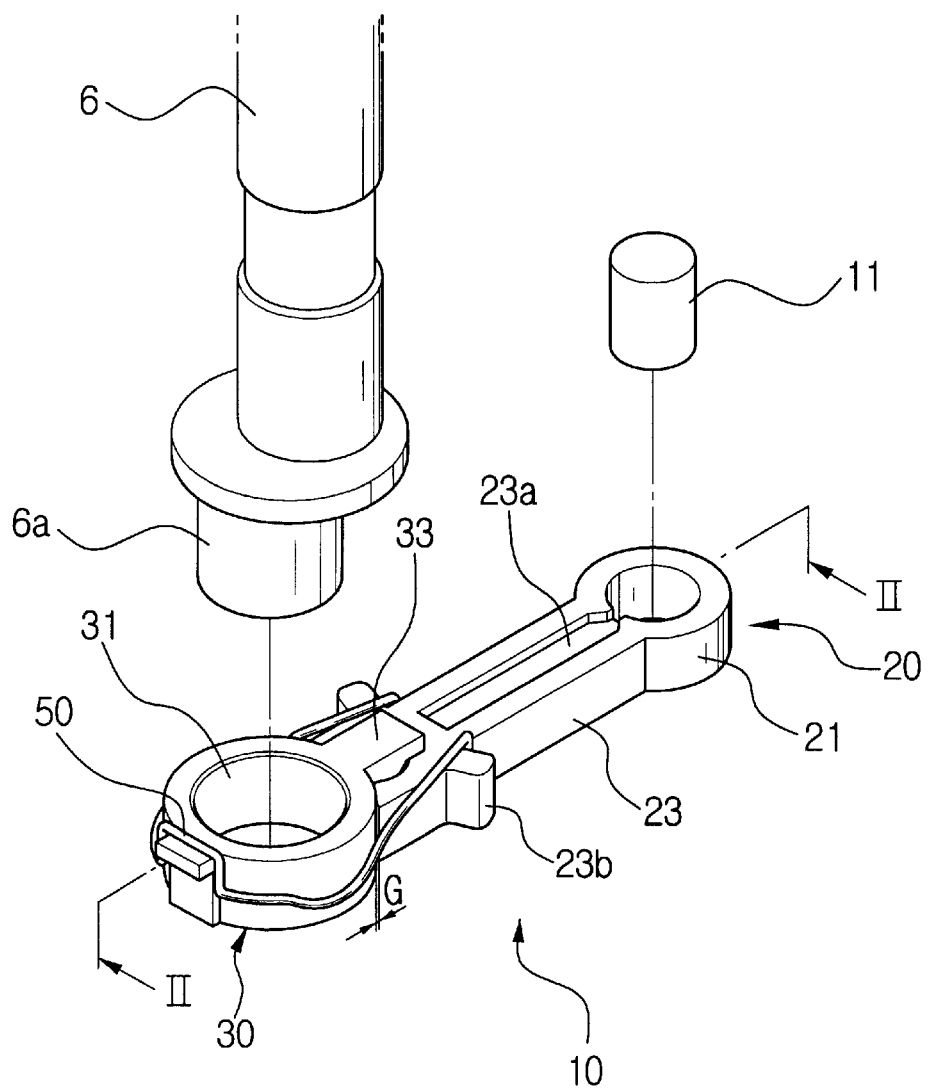
FIG. 1 is a perspective view schematically showing a connecting-rod of a hermetic reciprocal compressor according to the preferred embodiment of the present invention.
Figure 2:
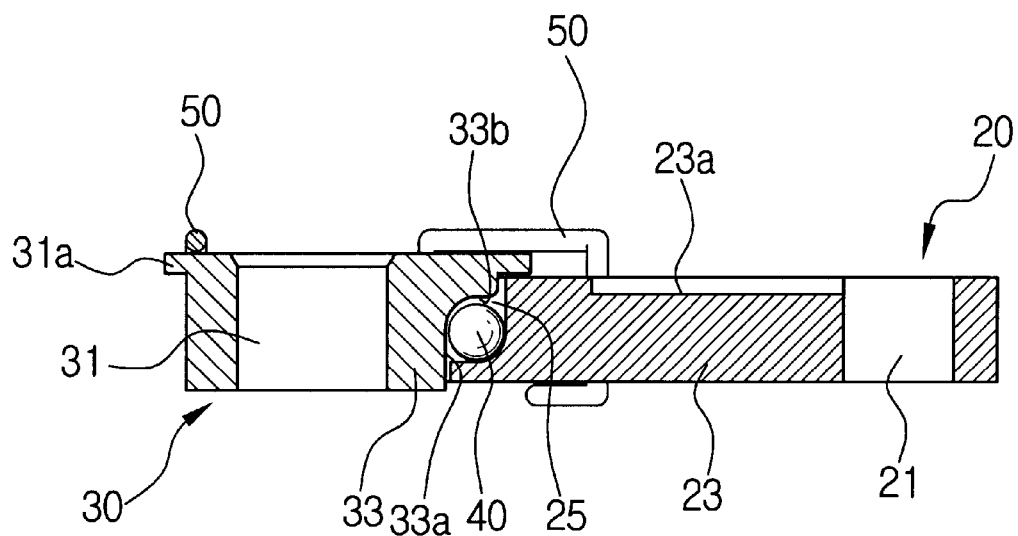
FIG. 2 is a sectional view taken on line II—II of FIG. 1.

Referring to FIGS. 1 and 2, the connecting-rod apparatus 10 of the hermetic reciprocal compressor (not shown) according to the preferred embodiment of the present invention includes a first connecting member 20, a second connecting member 30, a ball 40 and a third connecting member 50.

Figure 3:
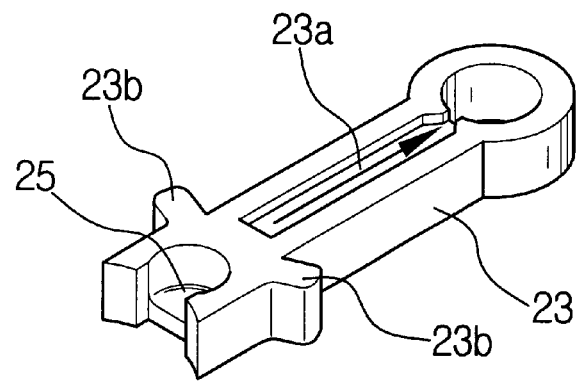
FIG. 3 is a perspective view of first connecting member shown in FIG. 1.

The first connecting member 20 has a small diameter portion 21 for receiving a piston pin 11 at one end thereof. A connection portion 23 is extended for a predetermined length to a direction outside of the small diameter portion 21. An oil passage 23a is formed in an upper side of the connection portion 23 for a predetermined depth. The oil passage 23a is connected with the small diameter portion 21. Moreover, a ball embracing hole 25 is formed at the end of the connection portion 23. Referring to FIG. 3, the ball embracing hole 25 is formed such that it is penetrated for a predetermined depth from an upper end and the end side of connection portion 23. It is preferred that the inside of the ball embracing hole 25 be in a round shape in order to be actively connected with the ball 40.

Furthermore, as shown in FIG. 1, the third connecting member 50 is connected with an end of the connection portion 23. Two locking members 23b are disposed at the end of the connection portion 23 in order to lock two distal ends of the third connecting member 50.

Figure 4:
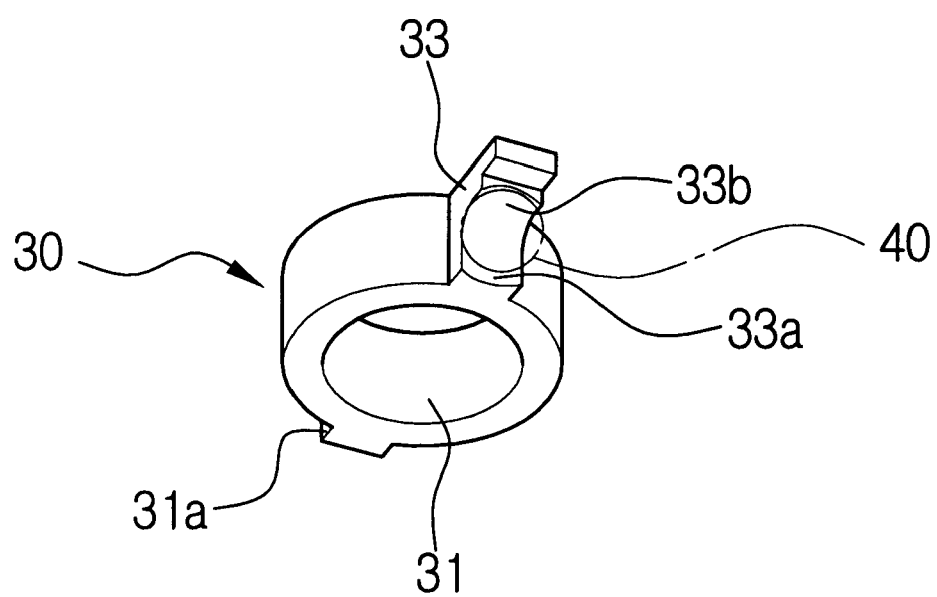
FIG. 4 is a perspective view of second connecting member shown in FIG. 1.

The second connecting member 30 has a large diameter portion 31 connected with an eccentric portion 6a disposed at an end portion of the crankshaft 6 of the compressor. A yoke portion 33 is formed at an outside of the large diameter portion 31 to support the ball 40 (see FIG. 2) being inserted in the ball embracing hole 25 (also FIG. 2) when the yoke portion 33 is connected with the first connecting portion 20. The yoke portion 33 prevents the ball 40 inserted in the ball embracing hole 25 from being separated, and is connected to allow the ball 40 to roll. As shown in FIG. 4, the yoke portion 33 has a vertical side 33a and a sloping side 33b, both formed in a vertical direction contacting with the ball 40. It is preferred that the vertical side 33a and the sloping side 33b be round in order to broaden the area contacting the ball 40.

Therefore, as the ball 40 is contacted with the yoke portion 33 and the ball embracing hole 25, respectively, and rolled, the first connecting member 20 and the second connecting member 30 are moved relative to one another. Here, the ball 40 is a metallic material and has a diameter of about 2.54 mm to about 8.46 mm.

Moreover, as shown in FIG. 1, it is preferred that a predetermined flexible gap G be defined between the end portion of the connection portion 23 and the large diameter portion 31 when the first connecting member 20 and the second connecting member 30 are connected with each other, with the ball 40 being placed therebetween. It is also preferred that the flexible gap be between about 0.2 mm to about 0.5 mm. As the flexible gap is defined, the first connecting member 20 and the second connecting member 30 can move without being impeded by each other when the first connecting member 20 and the second connecting member 30 move relative to each other.

It is preferred that the third connecting member 50 be a metal wire or other flexible material having a predetermined shape in order to secure the large diameter portion 31 and the end portion of the connection portion 23 together. The third connecting member 50 has a predetermined width, and the two distal ends of the third connecting member 50 are connected with the locking members 23b. In addition, a protrusion 31a (FIG. 2) is disposed at an outside of the large diameter portion 31 to support the third connecting member 50. The third connecting member 50 prevents the first connecting member 20 and the second connecting member 30 from being separated from each other by connecting two members 20 and 30 with so-called 'One Touch' method, and allows two members 20 and 30 to relatively move.

In the connecting apparatus 10 of a hermetic reciprocal compressor having the above structure according to the preferred embodiment of the present invention, the eccentric portion of the crankshaft 6 and the piston are connected to the first connecting member 20 and the second connecting member 30. At this time, the first connecting member 20 and the second connecting member 30 can move in a predetermined range by the ball 40 disposed between the two connecting members 20 and 30. As the two connecting members 20 and 30 move in a rolling contact with the ball 40, less friction is generated and the noise caused by the friction is reduced.

Furthermore, even though mis-alignment between the axis of the shaft 6 and the axis of the piston may be generated by assemble tolerance and manufacturing tolerance, the tolerance can be compensated by the relative movement of the connecting members 20 and 30.

With the connecting apparatus 10 of the hermetic reciprocal compressor according to the present invention, when of the axis of the shaft and the axis of the piston is not arrayed, the mis-alignment can be compensated by a flexibility generated by the connection of the connecting members 20 and 30. Therefore, the noise and the abrasion of the compressor can be reduced.

Although the preferred embodiment of the present invention has been described, it will be understood by those skilled in the art that the present invention should not be limited to the described preferred embodiment, but various changes and modifications can be made in light of the above teachings and within the purview of the appended claims without departing from the spirit and intended scope of the invention.

What is claimed is:

1. A connecting apparatus of a hermetic reciprocal compressor to convert a rotary movement into a reciprocal sliding movement by connecting an eccentric portion of a crankshaft and a piston, comprising:

a ball;

a first connecting member having a small diameter portion connected with a piston pin being connected with the piston, and a connection portion extended from the small diameter portion, wherein the connection portion has a ball embracing surface to embrace the ball and supports the ball to be moved;

a second connecting member having a large diameter portion rotatably connected with the eccentric portion, and an extending yoke portion at an outside of the large diameter portion, the yoke portion supporting the ball against the embracing surface and preventing the ball from being separated; and a third connecting member for connecting the first connecting member and the second connecting member such that the first connecting member and the second connecting member relatively move with the ball placed therebetween.

2. The connecting apparatus of claim 1, wherein the ball embracing surface is penetrated from an upper side and an end side of an end portion of the connection portion for a predetermined depth.

3. The connecting apparatus of claim 2, wherein the yoke portion is extended from an outside of the large diameter portion in order to face the ball embracing surface, and includes a vertical side and a sloping side formed with respect to a vertical direction to allow the ball to be contacted, wherein the vertical side and the sloping side are formed as an arc shape in a horizontal direction.

4. The connecting apparatus of claim 1, wherein, when the first connecting member and the second connecting member are connected, a predetermined flexible gap is defined between an end portion of the connection portion and an outside of the large diameter portion so that the first connecting member and the second connecting member can be relatively rotated.

5. The connecting apparatus of claim 4, wherein the flexible gap is between about 0.2 mm and about 0.5 mm.

6. The connecting apparatus of claim 1, wherein the third connecting member is a metal wire for securing the large diameter portion and the connection portion together.

7. The connecting apparatus of claim 1, wherein the first connecting member has an oil passage that penetrates in an upper side of the connection portion and is connected with the small diameter portion, and an oil dropping from the yoke portion of the second connecting member is supplied to the small diameter portion through the oil passage.

* * * * *